United States Patent
Nagata

(10) Patent No.: US 9,436,353 B2
(45) Date of Patent: Sep. 6, 2016

(54) SYSTEMS AND METHODS FOR PROVIDING A DYNAMIC APPLICATION MENU

(71) Applicant: Toyota Motor Engineering & Manufacturing North America, Inc., Erlanger, KY (US)

(72) Inventor: Katsumi Nagata, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 273 days.

(21) Appl. No.: 14/224,136

(22) Filed: Mar. 25, 2014

(65) Prior Publication Data

US 2015/0277671 A1     Oct. 1, 2015

(51) Int. Cl.
| | | |
|---|---|---|
| *G06F 15/00* | (2006.01) | |
| *G06F 13/00* | (2006.01) | |
| *G06F 3/0482* | (2013.01) | |
| *G06F 3/0481* | (2013.01) | |
| *G06F 3/0484* | (2013.01) | |

(52) U.S. Cl.
CPC ......... *G06F 3/0482* (2013.01); *G06F 3/04817* (2013.01); *G06F 3/04842* (2013.01); *G06F 3/04847* (2013.01)

(58) Field of Classification Search
CPC ............. G06F 3/04871; G06F 3/0488; G06F 3/04842
USPC ....... 715/811, 835, 740, 749, 738, 768, 788, 715/822
See application file for complete search history.

(56) References Cited

U.S. PATENT DOCUMENTS

| | | |
|---|---|---|
| 6,907,328 B2 | 6/2005 | Fehr et al. |
| 7,600,193 B2 | 10/2009 | Gunderson |
| 7,630,802 B2 | 12/2009 | Breed |
| 7,813,822 B1 | 10/2010 | Hoffberg |
| 7,974,714 B2 | 7/2011 | Hoffberg |
| 8,629,784 B2 | 1/2014 | Szczerba et al. |
| 8,943,438 B2 * | 1/2015 | Matsumoto ........... G06F 9/4443 715/822 |
| 2009/0177392 A1 | 7/2009 | Komaba |
| 2010/0218141 A1 | 8/2010 | Xu et al. |
| 2011/0072492 A1 | 3/2011 | Mohler et al. |

(Continued)

FOREIGN PATENT DOCUMENTS

JP     2011159077 A     8/2011

OTHER PUBLICATIONS

"How to sort your Android apps automatically," 4 pages, dated Jan. 10, 2014, hoto.cnet.com/8301-11310_39-20102984-285/how-to-sort-your-android-apps-automatically.

*Primary Examiner* — Kevin Nguyen
(74) *Attorney, Agent, or Firm* — Dinsmore & Shohl LLP

(57) ABSTRACT

Systems and methods for providing a dynamic application menu are provided herein. One embodiment of a method includes receiving a first arrangement of application icons, determining usage data regarding an application that is associated with the application icons, and determining a plurality of different criteria for arranging the application icons based on the usage data. Some embodiments include determining a preferred criterion from the plurality of different criteria, providing a second arrangement of the application icons for a dynamic application menu based on the usage data and the preferred criterion, and providing an option to send a signal to rearrange the application icons on a mobile device to substantially match the second arrangement of the application icons.

20 Claims, 4 Drawing Sheets

(56) References Cited

U.S. PATENT DOCUMENTS

| | | |
|---|---|---|
| 2012/0096404 A1 | 4/2012 | Matsumoto et al. |
| 2012/0268262 A1 | 10/2012 | Popovic |
| 2013/0007662 A1 | 1/2013 | Bank et al. |
| 2014/0089329 A1* | 3/2014 | Kozloski ................ G06F 19/22 707/749 |
| 2014/0181751 A1* | 6/2014 | Won ...................... G06F 3/0488 715/835 |
| 2014/0195972 A1* | 7/2014 | Lee ..................... G06F 3/04817 715/811 |
| 2015/0301998 A1* | 10/2015 | Park-Ekecs ........... G06F 9/4443 715/254 |

* cited by examiner

SYSTEMS AND METHODS FOR PROVIDING A DYNAMIC APPLICATION MENU

TECHNICAL FIELD

Embodiments described herein generally relate to systems and methods for providing a dynamic application menu and, more specifically, to customizing display based on past use of an application.

BACKGROUND

Many user interfaces utilize icons for accessing various applications. Currently, these applications may be organized according to a user-defined arrangement or a default arrangement. While such a configuration may provide the user with access to the desired applications, oftentimes this arrangement does not maximize efficiency in using the particular device that runs the applications.

SUMMARY

Systems and methods for providing a dynamic application menu are described. One embodiment of a method includes receiving a first arrangement of application icons, determining usage data regarding an application associated with the application icons, and determining a plurality of different criteria for arranging the application icons based on the usage data. Some embodiments include determining a preferred criterion from the plurality of different criteria, providing a second arrangement of the application icons for a dynamic application menu based on the usage data and the preferred criterion, and providing an option to send a signal to rearrange the application icons on a mobile device to substantially match the second arrangement of the application icons.

In another embodiment, a system for providing a dynamic application menu includes a display device and a vehicle computing device that is coupled to the display device. The vehicle computing device may include a memory component that stores logic that, when executed by the system, causes the system to receive a first arrangement of application icons, determine usage data regarding an application associated with the application icons, and determine a plurality of different criteria for arranging the application icons based on the usage data. In some embodiments, the logic causes the system to determine a preferred criterion from the plurality of different criteria, provide a second arrangement of the application icons based on the usage data and the preferred criteria, and provide an option to send a signal to rearrange the application icons on a mobile device to substantially match the second arrangement of the application icons. In still some embodiments, the logic causes the system to provide the second arrangement of the application icons in a dynamic application menu to the display device for display.

In yet another embodiment, a vehicle computing device includes logic configured to cause the vehicle computing device to receive a first arrangement of application icons, where the application icons are associated with a plurality of respective applications, determine usage data regarding an application associated with the application icons, and determine a plurality of different criteria for arranging the application icons based on the usage data. In some embodiments, the logic causes the vehicle computing device to determine a preferred criterion from the plurality of different criteria, provide a second arrangement of the application icons based on the usage data and the preferred criteria, and provide an option to send a signal to rearrange the application icons on a mobile device to substantially match the second arrangement of the application icons. In still some embodiments, the logic causes the vehicle computing device to provide the second arrangement of the application icons in a dynamic application menu for display on a display device and store information regarding usage of the plurality of respective applications for determining whether to alter the second arrangement of the application icons.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing a dynamic application menu. Some embodiments are configured to determine which applications are most often used; are used for the longest periods; are used most recently; etc. and utilize this information to arrange application icons. While such embodiments may relate to a smart phone, vehicle computing device, or other computing device, some embodiments may be configured to arrange icons from a computing device onto a vehicle display or vice versa. As an example, a vehicle computing device may sync with a mobile device, such as a smart phone. The smart phone may include a plurality of applications with respective icons. The vehicle computing device may provide hands-free operation of the smart phone and thus may provide a reproduction of the user interface from the smart phone. Accordingly, some embodiments may be configured such that the vehicle computing device may rearrange icons from the smart phone onto a vehicle display, based on the above stated criteria. Depending on the particular configuration, the user interface of the smart phone may be unaffected or altered according to a user designation.

Accordingly, some embodiments are configured to cycle through a predetermined list of sorting criteria. As an example, the smart phone and/or the vehicle computing device may first determine whether an application location is locked. If so, the application may remain in its locked position. If not, a determination may be made regarding whether the applications are sorted based on last usage. If so, the applications may be so sorted. If not, a determination is made regarding whether the applications are sorted based on operation time. If not, a determination is made regarding whether the applications are sorted based on an active count. If the applications are not sorted based on an active count, a determination is made regarding whether they applications may be sorted based on other criteria.

Figure 1:
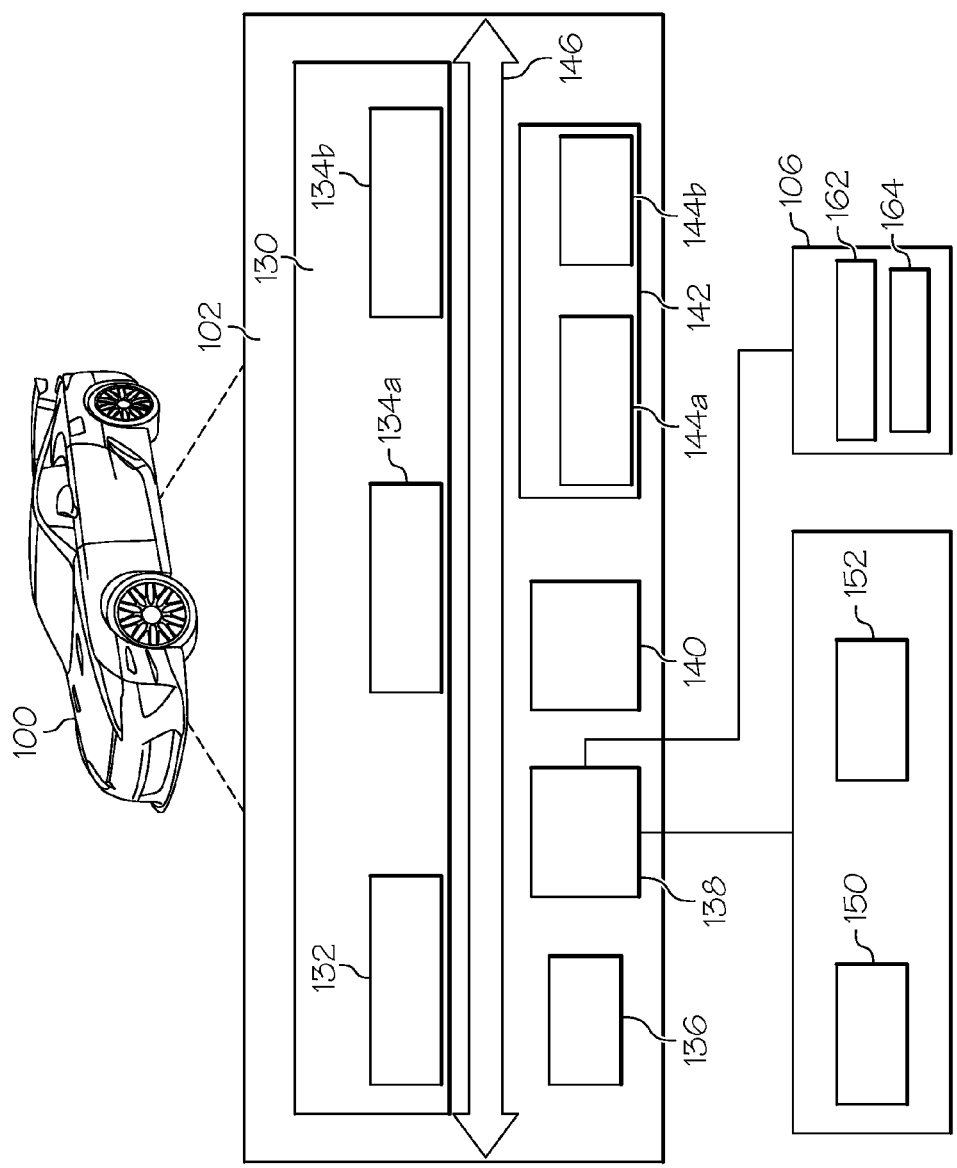
FIG. 1 schematically depicts a vehicle that may utilize a dynamic application menu, according to embodiments disclosed herein.

Referring now to the drawings, FIG. 1 schematically depicts a vehicle 100 that may utilize a dynamic application menu, according to embodiments disclosed herein. As illustrated, the vehicle 100 may include a vehicle computing device 102. The vehicle computing device 102 may include a memory component 130, a processor 136, input/output hardware 138, network interface hardware 140, and a data storage component 142 (which stores application data 144a, selection criteria data 144b, and/or other data). The memory component 130 may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 102 and/or external to the vehicle computing device 102.

The memory component 130 may store operating logic 132, application logic 134a and arrangement logic 134b. The application logic 134a and the arrangement logic 134b may each include a plurality of different pieces of logic, each of which may be embodied as a computer program, firmware, and/or hardware, as an example. A communications path 146 is also included in FIG. 1 and may be implemented as a bus or other communication interface to facilitate communication among the components of the vehicle computing device 102.

The processor 136 may include any processing component operable to receive and execute instructions (such as from a data storage component 142 and/or the memory component 130). As described above, the input/output hardware 138 may include and/or be configured to interface with external components, such as the in-vehicle display 150 and/or the other devices 152. As described in more detail below, the in-vehicle display 150 may include one or more one or more visual display devices, such as video monitors, in-dash touch screen control interfaces, windshield displays and/or other similar devices for providing alerts to a vehicle user. The other devices may include computing devices, such as smart phones, laptop computers, remote servers, desktop computers, etc.

The network interface hardware 140 may include and/or be configured for communicating with any wired or wireless networking hardware, including an antenna, a modem, a LAN port, wireless fidelity (Wi-Fi) card, WiMax card, mobile communications hardware, Bluetooth, Near Field Communication, and/or other hardware for communicating with other networks and/or devices. From this connection, communication may be facilitated between the vehicle computing device 102 and other computing devices. Accordingly, the network interface hardware 140 may include and/or be configured for communicating with a devices over a wide area network, and/or with local devices via a near field communication protocol, which may be embodied as a near field communication component 162 and/or a wide area communication component 164.

The operating logic 132 may include an operating system and/or other software for managing components of the vehicle computing device 102. As discussed above, the application logic 134a may reside in the memory component 130 and may be configured to cause the processor 136 to provide one or more user applications and/or icons on the vehicle computing device 102. Similarly, the arrangement logic 134b may be utilized determine the priority and organization of the alerts determined via the application logic 134a.

It should be understood that while the components in FIG. 1 are illustrated as residing within and/or connected to the vehicle computing device 102, this is merely an example. In some embodiments, one or more of the components may reside external to the vehicle computing device 102. It should also be understood that, while the vehicle computing device 102 is illustrated as a single device, this is also merely an example. In some embodiments, the components depicted therein may reside on different computing devices.

Additionally, while the vehicle computing device 102 is illustrated with the application logic 134a and the arrangement logic 134b as separate logical components, this is also an example. In some embodiments, a single piece of logic may cause the vehicle computing device 102 to provide the described functionality.

Figure 2:
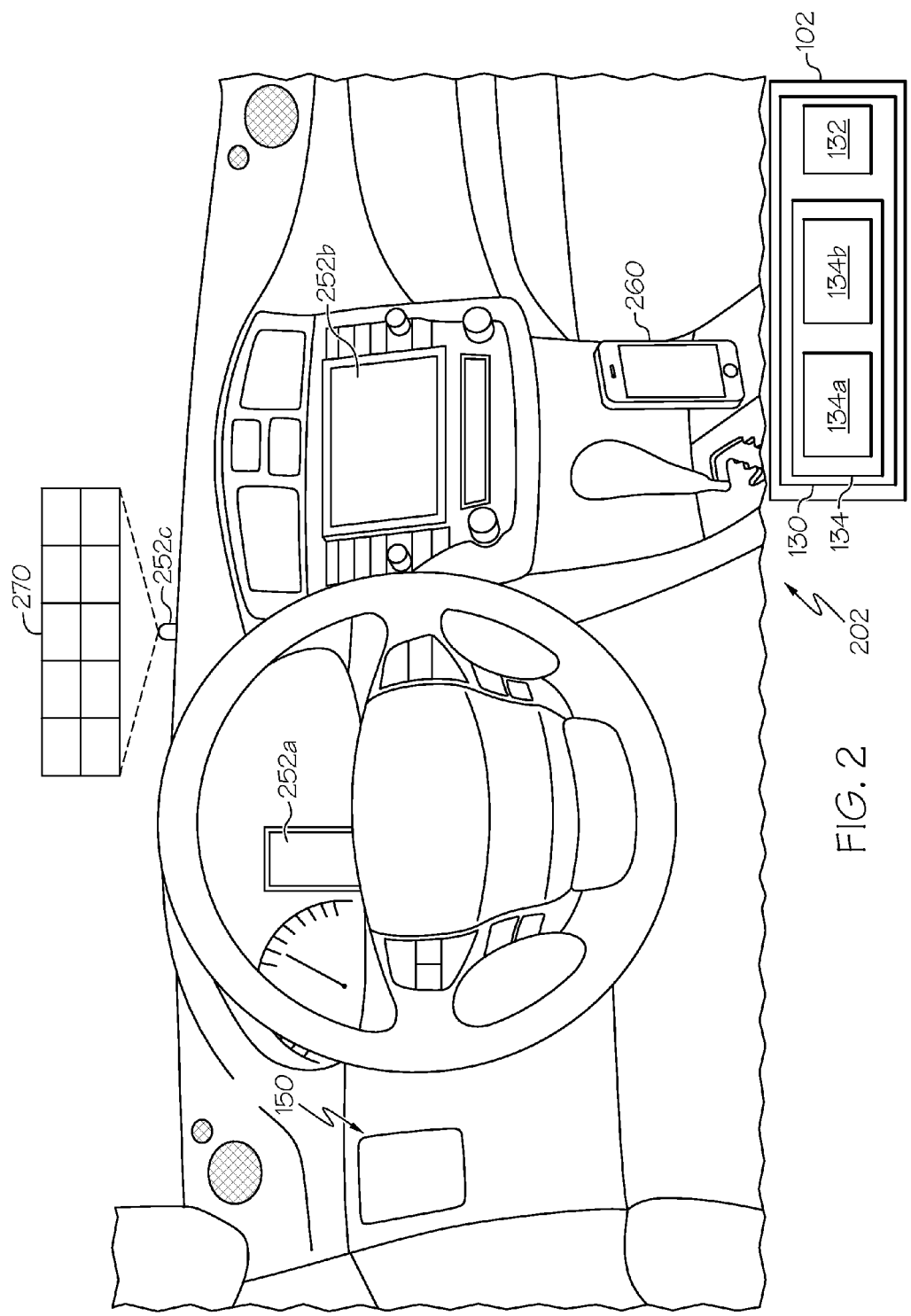
FIG. 2 schematically depicts a vehicle interior that may utilize a dynamic application menu, according to embodiments disclosed herein.

FIG. 2 schematically depicts a vehicle interior 202 that may utilize a dynamic application menu, according to embodiments disclosed herein. As illustrated, the vehicle 100 may include the vehicle computing device 102 and the memory component 134, with the operating logic 132, the application logic 134a, and the arrangement logic 134b. The vehicle interior 202 includes a plurality of display devices 252a, 252b, and 252c (collectively referred to as "the display devices 252"). The display devices 252 include an in-dash display 252a, a console display device 252b, and a windshield display 252c. The display devices 252 may include an input/output interface for displaying one or more application icons to a user. Also included is a mobile device 260. The mobile device 260 may be configured to communicate with the vehicle computing device 102, to provide functionality and/or applications to the vehicle computing device 102, as described herein.

The windshield display 252c and/or the other display devices 252 may be configured to provide a dynamic application menu 270 that includes a plurality of application icons. The applications may be provided by the vehicle computing device 102 and/or by the mobile device 260. Accordingly, the vehicle computing device 102 may be configured to receive the application data from the mobile device 106. The application data may include functionality for the applications and/or a use data for one or more of the applications.

As an example, the vehicle computing device 102 may provide one or more locally stored applications for the user to utilize. The vehicle computing device 102 may track the usage of these applications. Additionally, the mobile device 260 may provide functionality to the vehicle computing device 102. Specifically, the vehicle computing device 102 may be utilized as an interface for the user to utilize the applications from the mobile device 260. Accordingly, the user may operate the mobile device 260 by interacting with the display devices 252 in the vehicle 100, such as on the windshield, the console, and/or the dashboard. Accordingly, the vehicle computing device 102 may track the usage of the applications that are provided by the vehicle computing device 102 from the mobile device 260. In some embodiments, the mobile device 260 may provide usage information to the vehicle computing device 102 when the mobile device 260 is not paired with the vehicle computing device 102.

Accordingly the vehicle computing device 102 may provide the dynamic application menu 270 that includes a plurality of icons from the vehicle computing device 102 and/or from the mobile device 260. The user may activate the applications by selecting the respective icons. Additionally, the vehicle computing device 102 may determine various usage data for the applications and rearrange one or more of the application icons to provide an efficient icon arrangement for future usage.

It should be understood that, in some embodiments, an option may be provided to send a signal to the mobile device 260 to substantially match the arrangement of the application icons on the display on the mobile device 260 with that of the vehicle display. Accordingly, the mobile device 260 may accommodate this arrangement permanently and/or only implement this arrangement when in the proximity of the vehicle 100.

Figure 3A:
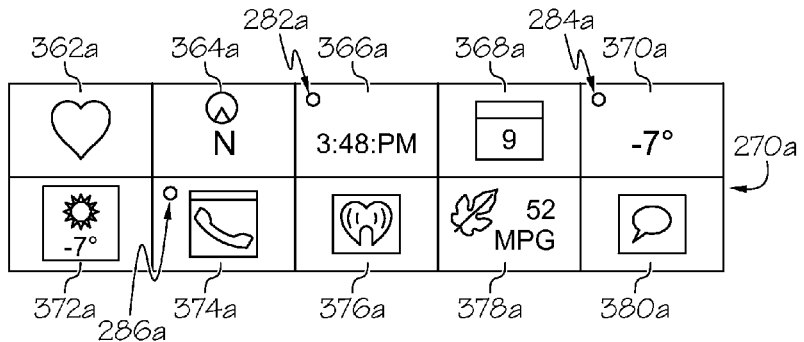
FIGS. 3A-3D schematically depict a plurality of user interfaces that may utilize a dynamic application menu, according to embodiments disclosed herein.

FIGS. 3A-3D schematically depict a plurality of user interfaces that may utilize dynamic application menus 270a-270d, according to embodiments disclosed herein. As illustrated in FIG. 3A, the dynamic application menu 270a includes a first arrangement of application icons, including a favorites application icon 362a, a compass application icon 364a, a time application icon 366a, a calendar application icon 368a, a temperature application icon 370a, a weather application icon 372a, a telephone application icon 374a, a music application icon 376a, a fuel consumption application icon 378a, and a messaging application icon 380a. Also included are lock indicators 282a, 284a, and 286a. According to embodiments disclosed herein, the application icons 362a, 364a, 368a, 372a, 376a, 378a, and 380a may be rearranged according to one or more usage statistics. However, the lock indicators 282a, 284a, and 286a identify those applications that have been locked in their current position. A locking option may be provided for the user and/or administrator to lock at least one application icon in a predetermined position. Regardless, those application icons will remain in their current position, while the remaining application icons may be rearranged, based on usage statistics, as described herein.

Figure 3B:
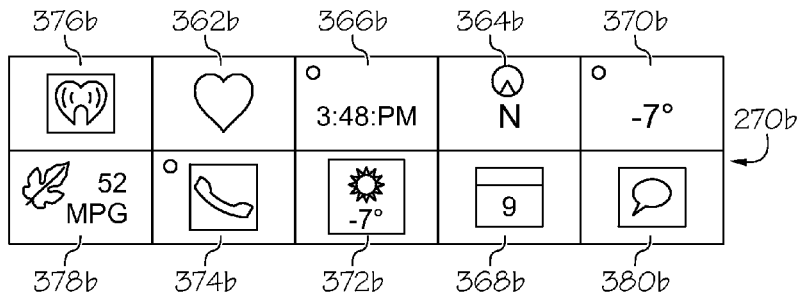
Figure 3C:
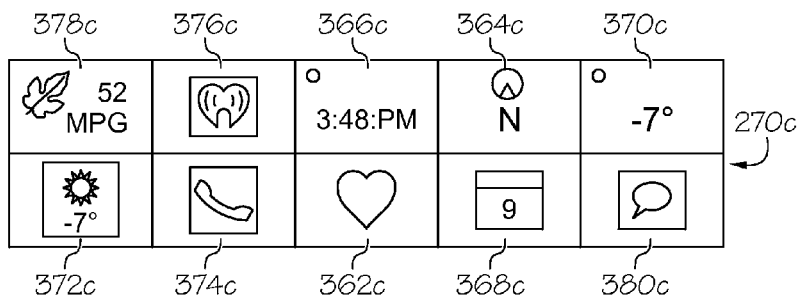
Figure 3D:
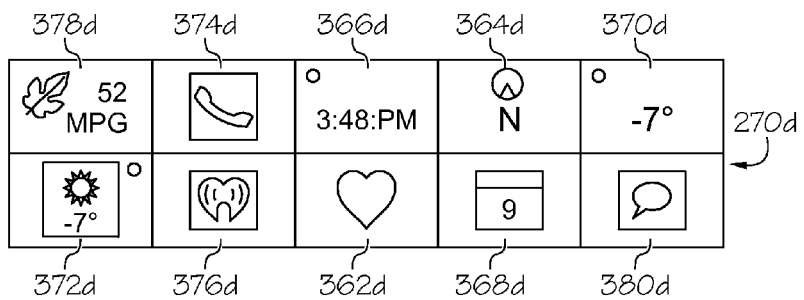

Accordingly, FIG. 3B depicts a dynamic application menu 270b with second arrangement of application icons 362b-380b, where the locked application icons remained in the locked position, while other application icons were rearranged, according to usage. Specifically, the music application 376b was moved from the position of FIG. 3A because this application was utilized more often. Similarly, the fuel consumption application icon 378b was utilized more often other applications and was thus moved as well. FIG. 3C depicts a dynamic application menu 270c providing yet another arrangement of application icons 362c-380c where the user unlocked the telephone application icon 374c, thus allowing this application icon to change position based on use. FIG. 3D depicts yet another dynamic application menu 270d with another arrangement of application icons 362d-380d that the weather application icon 372d is locked and the user had utilized the phone application icon 374d for longer than the music application icon 376d and was thus moved into a more prominent or desired position.

Figure 4:
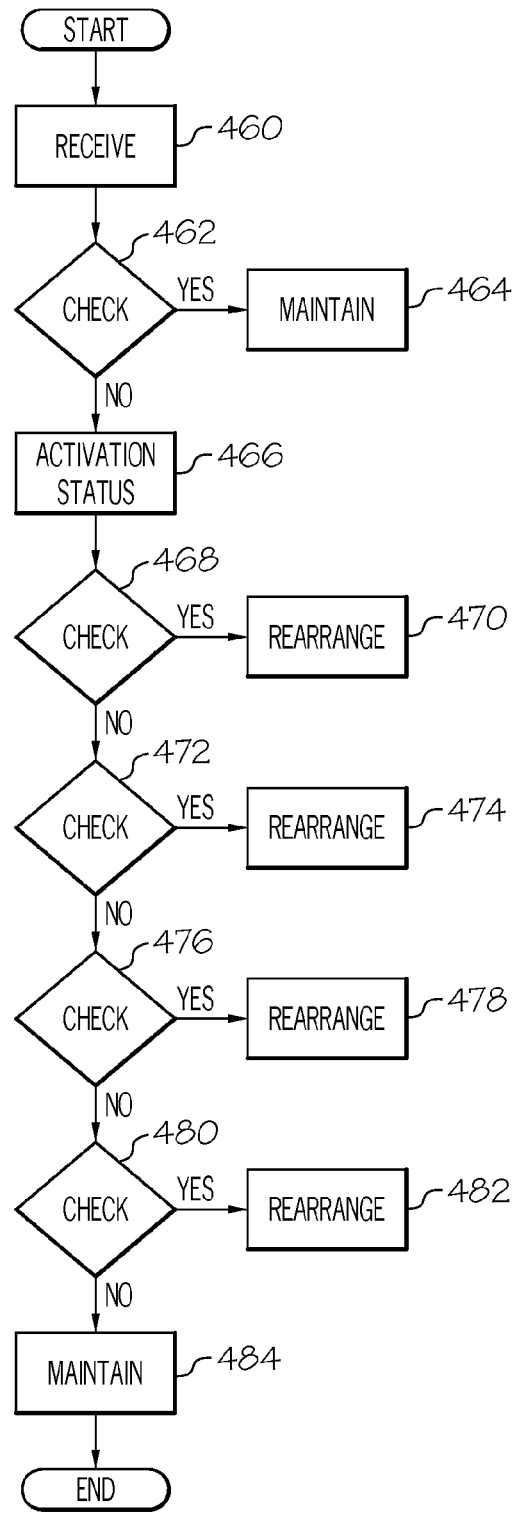
FIG. 4 depicts a flowchart for providing a dynamic application menu, according to embodiments disclosed herein.

FIG. 4 depicts a flowchart for providing a dynamic application menu with a plurality of different criteria, according to embodiments disclosed herein. As illustrated in block 460, selection of an application may be received. In block 462, a determination may be made regarding whether a position of an application icon has been locked. If so, in block 464, the current location of that application icon may be maintained. If not, in block 466, a determination may be made regarding the current activation status. In block 468 a determination may be made regarding whether the preferred criterion for sorting is based on last application utilized. If so, in block 470, the application icons may be rearranged based on which application was utilized most recently. If not, in block 472, a determination may be made regarding whether the preferred arrangement process is based on operation time. If so, in block 474, the application icons may be rearranged based on the applications that have been utilized for the longest amount of time. If not, in block 476, a determination may be made regarding whether the preferred arrangement process is based on active usage count. If so, in block 478, the application icons may be rearranged based on the most often sued application icons. If not, in block 480, a determination may be made regarding whether the preferred arrangement process is by user selection. If so, in block 482, the application icons may be rearranged by user selection. If not, in block 484, the current arrangement may be maintained.

It should be understood that the priority of blocks 468, 472, 476, and 480 depend on the preferred criteria for arrangement. This may be determined based on an administrator setting and/or a user setting, depending on the particular embodiment. Accordingly, some embodiments may utilize a different order of sorting processes than depicted in FIG. 4.

As illustrated above, various embodiments for providing a dynamic application menu are disclosed. Accordingly, embodiments disclosed herein may efficiently arrange application icons from a vehicle computing device and/or a mobile device to provide a menu interface with an efficient arrangement of application icons. This allows a user to more quickly access the highest used applications with greater ease.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for providing a dynamic application menu. It should also be understood that these embodiments are merely exemplary and are not intended to limit the scope of this disclosure.

What is claimed is:

1. A method for providing a dynamic application menu comprising:

receiving, by a computing device, a first arrangement of application icons;

determining, by the computing device, usage data regarding applications associated with the application icons;

determining, by the computing device, a plurality of different criteria for arranging the application icons based on the usage data;

determining, by the computing device, a preferred criterion from the plurality of different criteria;

providing, by the computing device, a second arrangement of the application icons for a dynamic application menu based on the usage data and the preferred criteria; and providing, by the computing device, an option to send a signal to rearrange the application icons on a mobile device to substantially match the second arrangement of the application icons.

2. The method of claim 1, wherein the plurality of different criteria includes at least one of the following: arranging by last usage, arranging by operation time, arranging by active use count, and arranging by user selection.

3. The method of claim 1, further comprising providing a locking option to lock at least one application icon into a predetermined position.

4. The method of claim 1, wherein the preferred criteria is determined via a user selection.

5. The method of claim 1, wherein receiving a first arrangement includes receiving data from the mobile device regarding an application on the mobile device.

6. The method of claim 1, wherein at least one of the application icons is associated with an application that is provided by the mobile device.

7. The method of claim 1, further comprising providing an option to send an identification of an arrangement of the application icons to the mobile device for implementing on the mobile device.

8. A system for providing a dynamic application menu comprising:
　a display device; and
　a vehicle computing device that is coupled to the display device and includes a memory component that stores logic that, when executed by the system, causes the system to perform at least the following:
　　receive a first arrangement of application icons;
　　determine usage data regarding applications associated with the application icons;
　　determine a plurality of different criteria for arranging the application icons based on the usage data;
　　determine a preferred criterion from the plurality of different criteria;
　　provide a second arrangement of the application icons based on the usage data and the preferred criteria;
　　provide an option to send a signal to rearrange the application icons on a mobile device to substantially match the second arrangement of the application icons; and
　　provide the second arrangement of the application icons in a dynamic application menu to the display device for display.

9. The system of claim 8, wherein the plurality of different criteria includes at least one of the following: arranging by last usage, arranging by operation time, arranging by active use count, and arranging by user selection.

10. The system of claim 8, wherein the logic further causes the system to provide a locking option to lock at least one application icon into a predetermined position.

11. The system of claim 8, wherein the preferred criteria is determined via a user selection.

12. The system of claim 8, wherein receiving a first arrangement includes receiving data from the mobile device regarding an application on the mobile device.

13. The system of claim 8, wherein at least one of the application icons is associated with an application that is provided by the mobile device.

14. The system of claim 8, further comprising providing an option to send an identification of an arrangement of the application icons to the mobile device for implementing on the mobile device.

15. A vehicle computing device for providing a dynamic application menu comprising:
　a memory component that stores logic that, when executed by the vehicle computing device, causes the vehicle computing device to perform at least the following:
　　receive a first arrangement of application icons, wherein the application icons are associated with a plurality of respective applications;
　　determine usage data regarding the application icons;
　　determine a plurality of different criteria for arranging the application icons based on the usage data;
　　determine a preferred criterion from the plurality of different criteria;
　　provide a second arrangement of the application icons based on the usage data and the preferred criteria;
　　provide an option to send a signal to rearrange the application icons on a mobile device to substantially match the second arrangement of the application icons;
　　provide the second arrangement of the application icons in a dynamic application menu for display on a display device; and
　　store information regarding usage of the plurality of respective applications for determining whether to alter the second arrangement of the application icons.

16. The vehicle computing device of claim 15, wherein the plurality of different criteria includes at least one of the following: arranging by last usage, arranging by operation time, arranging by active use count, and arranging by user selection.

17. The vehicle computing device of claim 15, wherein the logic further causes the vehicle computing device to provide a locking option to lock at least one application icon into a predetermined position.

18. The vehicle computing device of claim 15, wherein the preferred criteria is determined via a user selection.

19. The vehicle computing device of claim 15, wherein receiving a first arrangement includes receiving data from the mobile device regarding an application on the mobile device.

20. The vehicle computing device of claim 15, wherein at least one of the application icons is associated with an application that is provided by the mobile device.

\* \* \* \* \*